(12) United States Patent
Mitchell et al.

(10) Patent No.: US 7,496,361 B1
(45) Date of Patent: Feb. 24, 2009

(54) CONFIGURABLE CABIN ANTENNA SYSTEM AND PLACEMENT PROCESS

(75) Inventors: James P. Mitchell, Cedar Rapids, IA (US); Fatma Ayhan Sakarya, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 656 days.

(21) Appl. No.: 10/894,334

(22) Filed: Jul. 19, 2004

(51) Int. Cl.
*H04Q 7/20* (2006.01)
*H04N 7/18* (2006.01)

(52) U.S. Cl. .................. 455/423; 455/431; 455/446; 725/76

(58) Field of Classification Search ............ 725/73–77; 455/431, 452.2, 446, 423; 342/359, 360
See application file for complete search history.

(56) References Cited

U.S. PATENT DOCUMENTS

| | | | |
|---|---|---|---|
| 4,352,200 A | 9/1982 | Oxman | |
| 4,428,078 A | 1/1984 | Kuo | |
| 4,835,604 A | 5/1989 | Kondo et al. | |
| 5,546,397 A | 8/1996 | Mahany | |
| 5,682,476 A | 10/1997 | Tapperson et al. | |
| 5,875,180 A * | 2/1999 | Wiedeman et al. | 455/452.2 |
| 5,929,895 A | 7/1999 | Berry et al. | |
| 6,046,698 A * | 4/2000 | Pandey | 342/360 |
| 6,249,913 B1 | 6/2001 | Galipeau et al. | |
| 6,374,315 B1 | 4/2002 | Okada et al. | |
| 6,496,707 B1 * | 12/2002 | Chu et al. | 455/552.1 |
| 6,560,294 B1 | 5/2003 | Gatherer | |
| 6,597,151 B1 | 7/2003 | Price et al. | |
| 6,614,126 B1 | 9/2003 | Mitchell | |
| 6,810,527 B1 * | 10/2004 | Conrad et al. | 725/76 |
| 7,245,880 B1 * | 7/2007 | Jacobsen | 455/452.2 |
| 2003/0009761 A1 * | 1/2003 | Miller et al. | 725/76 |
| 2003/0086386 A1 * | 5/2003 | Tillotson | 370/321 |
| 2003/0114178 A1 * | 6/2003 | Chapelle et al. | 455/517 |
| 2004/0098745 A1 * | 5/2004 | Marston et al. | 725/73 |

OTHER PUBLICATIONS

Patent Application for "Method and Apparatus for High Availability Passenger Entertainment Content Delivery" by James P. Mitchell, U.S. Appl. No. 10/442,480, filed May 21, 2003.

* cited by examiner

*Primary Examiner*—Lester Kincaid
*Assistant Examiner*—Daniel Lai (57) ABSTRACT

A method of delivering programming to passenger seats with a wireless in-flight entertainment system in an aircraft cabin uses a configurable cabin antenna system. Control data and programming is delivered with a head end server and received with one or more access points connected to the head end server. One or more antenna systems, connected to the access points, are disposed at optimum selected locations in the aircraft cabin to provide the programming to the passengers. One or more personal electronic devices (PEDs) located receive the programming from the one or more configurable antennas. Beams of the one or more antenna systems are adjusted to deliver programming to the one or more PEDs at a required bit error rate.

2 Claims, 8 Drawing Sheets

CONFIGURABLE CABIN ANTENNA SYSTEM AND PLACEMENT PROCESS

CROSS REFERENCE TO RELATED APPLICATIONS

The present application is related to co-pending application Ser. No. 10/442,480 filed on May 21, 2003 entitled "Method and Apparatus for High Availability Passenger Entertainment Content Delivery" by James P. Mitchell. The co-pending application is assigned to the assignee of the present invention.

BACKGROUND OF THE INVENTION

The present invention relates to in-flight entertainment (IFE) systems and specifically to a wireless IFE distribution system with a configurable antenna system and a method of placement of the configurable antenna system within an aircraft cabin.

In-flight entertainment systems have been installed on commercial airliners for a number of years. An in-flight entertainment system typically comprises the components necessary to present entertainment content to an airline passenger while in flight. Current IFE systems are wired systems that deliver programming to passengers similar to a cable television system. The current systems comprise head end equipment where programming and control functions originate, a distribution subsystem and display systems. The entertainment content is distributed from the head end equipment to passengers by means of the distribution system. The display system receives the content from the distribution system, processes the content and displays it to the airline passengers.

Current IFE systems are best installed as an aircraft is being built. Existing aircraft may have retrofit systems installed. However retrofitting an existing aircraft with new wiring and cables is difficult and expensive. In addition wired systems are heavy due to the amount of wiring required to connect all the seats in an aircraft, comprise a large number of line replaceable units (LRU) such as distribution box equipment and seat equipment, and consume large amounts of power due to the large number of LRUs. Having a large number of LRUs also reduces reliability and increases cost.

Wireless IFE distribution systems offer many advantages over wired systems in an aircraft cabin. Retrofit installations on existing aircraft are much easier to accomplish due to the elimination of wires and cables. Finding locations for the many LRUs such as seat equipment is not required in a wireless system. Weight and power reductions are easily achievable with a wireless distribution system. Fewer LRUs result in less maintenance, more flexibility in IFE system installations, increased reliability, and reduced costs.

Aircraft cabins offer a considerable design challenge when developing a wireless distribution system for an IFE system. Standard wireless RF networking in an aircraft cabin can be suboptimal due to uneven coverage. Due to very complex aircraft absorption and blockage factors a single antenna for the whole cabin has been found to be not practical. The aircraft cabin's unique half-section linear tube shape (longer than it is wide by a factor of 5:1 in some cases) requires a beam pattern from an antenna system that does not overemphasize lateral RF projection otherwise self interference of repeating bands used within the system may occur.

An IFE system can require megabits of individual channel capacity in order to maintain video and other data services. Commercial off-the-shelf (COTS) wireless devices typically found in personal electronic devices are relatively band limited when considered to serve hundreds of passengers. COTS systems do not provide enough aggregate bandwidth to enable an entire cabin of passengers each with their own required bandwidth.

A multiple antenna cellular-type network can be used with beam shaping to compensate for cabin geometry as well as for adjacent cell interference potential. Each multiband cell antenna within each physical access point as a system must be controllable to maximally cover multi-seat cell areas. Cell bands must be reusable enabling coverage within a large aircraft cabin. Therefore a cabin wireless system having a radio and configurable antenna system meeting IFE requirements is needed along with a system and method for locating access points and calibration of the system.

SUMMARY OF THE INVENTION

A wireless in-flight entertainment (IFE) distribution system in an aircraft cabin for delivering programming to passengers in a plurality of seats is disclosed. The wireless IFE distribution system comprises a head end server that provides control data and the programming. One or more access points are connected to the head end server to receive the control data and programming and to provide the programming to the passengers. One or more configurable antenna systems, connected to the one or more access points, are disposed at optimum locations in the aircraft cabin to provide the programming at a minimum reliable RF power level to the plurality of seats. One or more personal electronic devices (PEDs) are located in the plurality of seats for receiving the programming from the one or more configurable antenna systems. The one or more configurable antenna systems have antenna beams adjusted to deliver programming to the one or more PEDs at a required bit error rate.

Each of the one or more configurable antenna systems receives control data from the head end server and controls the radiated beams with an algorithm performed by a computing device in the wireless in-flight entertainment system. Each of the one or more configurable antenna systems comprises a beam steerable antenna such as a phased array antenna, a mechanically switched antenna, a electronically switched antenna, or a hybrid switched antenna.

The optimum selected locations of the one or more configurable antenna systems are determined by measuring RF power level and fade data at the plurality of seats and by analyzing the data. The RF fade and power statistics are measured with an automated robotic system that volumetrically scans the seats and measures RF power levels and fade data and stores the data in an RF fade database.

The RF power level and fade data are analyzed to determine if the RF power level is sufficient to sustain the required data rate at each seat in a cell having a group of seats. If individual seats within the cell fall below a specified RF power level to sustain the required data rate the cell is compressed by moving antenna system spacing closer together or further apart or antenna system parameter adjustments are made. If individual seats within the cell are above a specified RF power level to sustain the required data rate the cell is expanded by moving antenna system spacing further apart or antenna system parameter adjustments are made.

The one or more access points and the one or more configurable antenna systems are installed in the optimum selected locations and antenna beams are adjusted in accordance with RF fade and power statistics.

The head end server performs a PED loop-back test comprising delivering test data while scanning an antenna beam, cataloging BER data according to seats and antenna beam position measured by a PED, computing alternative antenna beam pointing when all area seats are tested, reprogramming the antennas and reevaluating performance, and repeating these steps until maximum performance is found for an entire seat area to be served by each antenna.

The head end server sends commands to the one or more configurable antennas to make fine beam position adjustments based on a summary computation that considers minimum performance requirements to all seat areas and to maximize data rates to all seat areas.

It is an object of the present invention to provide an in-flight entertainment system having a configurable cabin antenna system and a process for installing antennas at optimum locations during aircraft manufacture or retrofit.

It is an object of the present invention to maximize wireless connectivity of each seat within an aircraft cabin while minimizing installation time.

It is an advantage of the present invention to use a configurable antenna system with beams adjustable to maximize connectivity of passenger seats.

It is an advantage of the present invention to provide a configurable antenna system with beam positions and RF power levels that are made programmable to adjust to a new cabin configuration arrangement when seats and dividers are moved that affect propagation.

It is a feature of the present invention to use an automated RF measurement system to perform cabin RF fading and power level measurements.

It is a feature of the present invention to provide a loop-back mode to evaluate connectivity and determine a best antenna beam position.

BRIEF DESCRIPTION OF THE DRAWINGS

The invention may be more fully understood by reading the following description of the preferred embodiments of the invention in conjunction with the appended drawings wherein.

DETAILED DESCRIPTION

The invention described herein is for a wireless in-flight entertainment (IFE) and data distribution system comprising a configurable antenna system and a placement process for locating the configurable antenna system in an aircraft in such locations as cabin and flight deck areas. The present invention enables placement and calibration of a plurality of separate antenna beams and frequency bands from each aircraft mounted antenna system and access point thereby minimizing the amount of aircraft hardware and mitigating interference from adjacent antenna systems and access points reusing the same RF bands or sub-bands while maximizing connectivity performance to each seat client within the aircraft. The present invention serves to reduce installation time of antenna systems and wireless access points within the aircraft.

Figure 1:
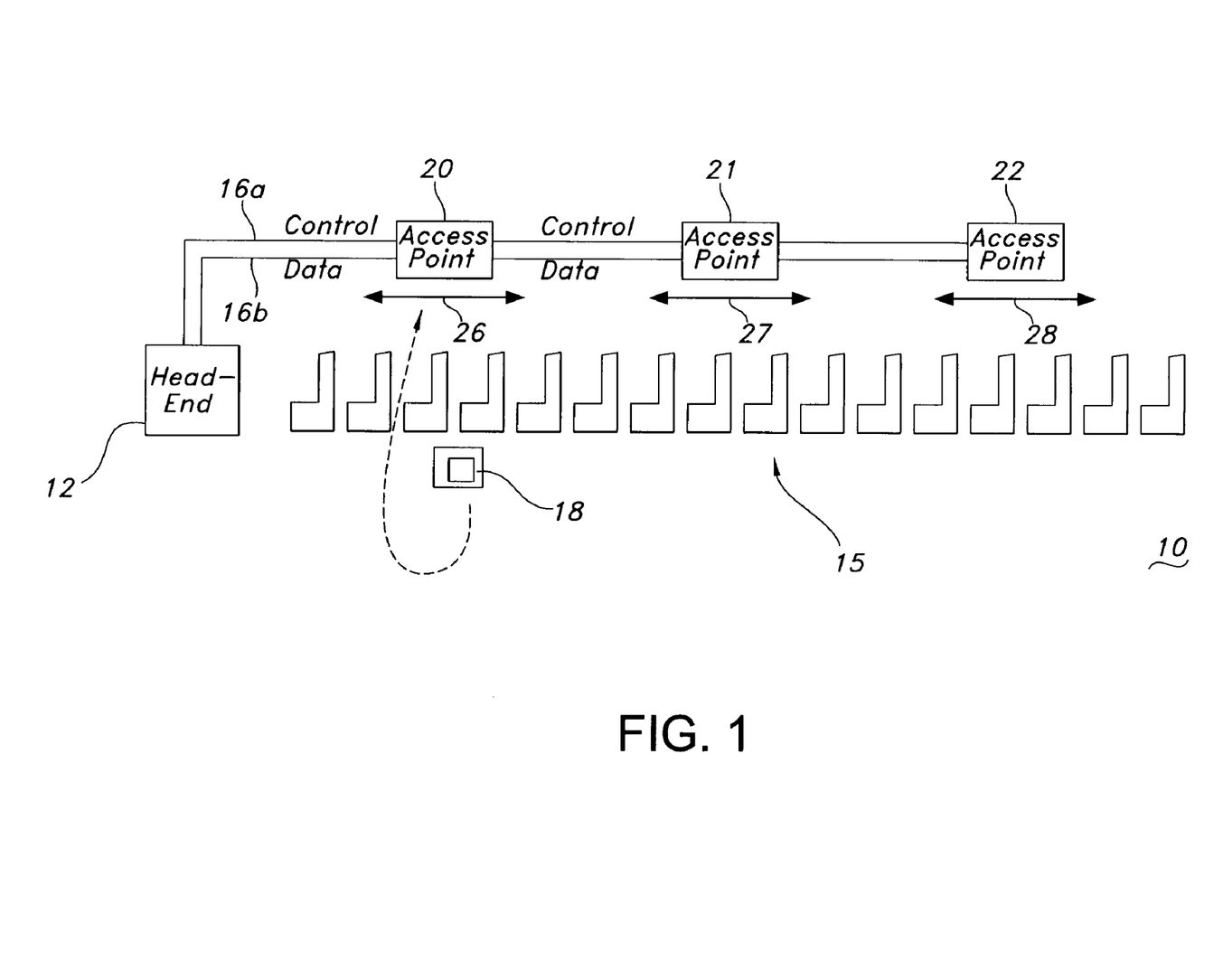
FIG. 1 is a simplified block diagram of a wireless IFE distribution system where the present invention for the configurable cabin antenna and method for placement and calibration of access points and associated antennas may be employed.

FIG. 1 is a simplified block diagram of a wireless IFE distribution system 10 where the present invention for the configurable antenna system and method for placement and calibration of antenna systems may be employed. In FIG. 1 a head end server 12 provides system control data and programming and data such as stored video, live video, aircraft intranet, Internet, e-mail, etc. to passengers (not shown) within the aircraft cabin. The system 10 shown in FIG. 1 may also be used to deliver data to flight deck areas such as the aircraft cockpit (not shown). The head end server 12 is connected to wireless access points 20, 21, and 22 with control line 16a and data lines 16b. While three access points 20-22 are shown in FIG. 1, the number can be more or less depending on aircraft size and coverage requirements.

Wireless access points 20, 21, and 22 may be commercial off-the-shelf (COTS) wireless devices available from a wide variety of manufacturers. Wireless access points 20, 21, and 22 support IEEE 802.11a, 802.11b, 802.11g, and 802.11n wireless standards. Antennas located with or within the access points 20, 21, and 22 transmit data to passengers in seats 15 in the aircraft cabin. The antennas may also be used to receive data from passengers in seats 15 in the form or Internet requests, e-mail messages, etc. The passengers may have personnel electronic devices (PED) 18 that are carried on the aircraft or supplied by the airline to receive data and programming from access points 20, 21, and 22. Only one PED 18 is shown in FIG. 1 but any number of passengers may have a PED 18. The PED 18 may be a laptop personal computer (PC) with a wireless card that supports IEEE 802.11a, b, g, and n operation to transmit and receive data and a compatible media player. The location of access points 20, 21, and 22 can move within the aircraft cabin as indicated by arrows 26, 27, and 28 to provide optimum coverage to groups of seats 15.

Figure 2:
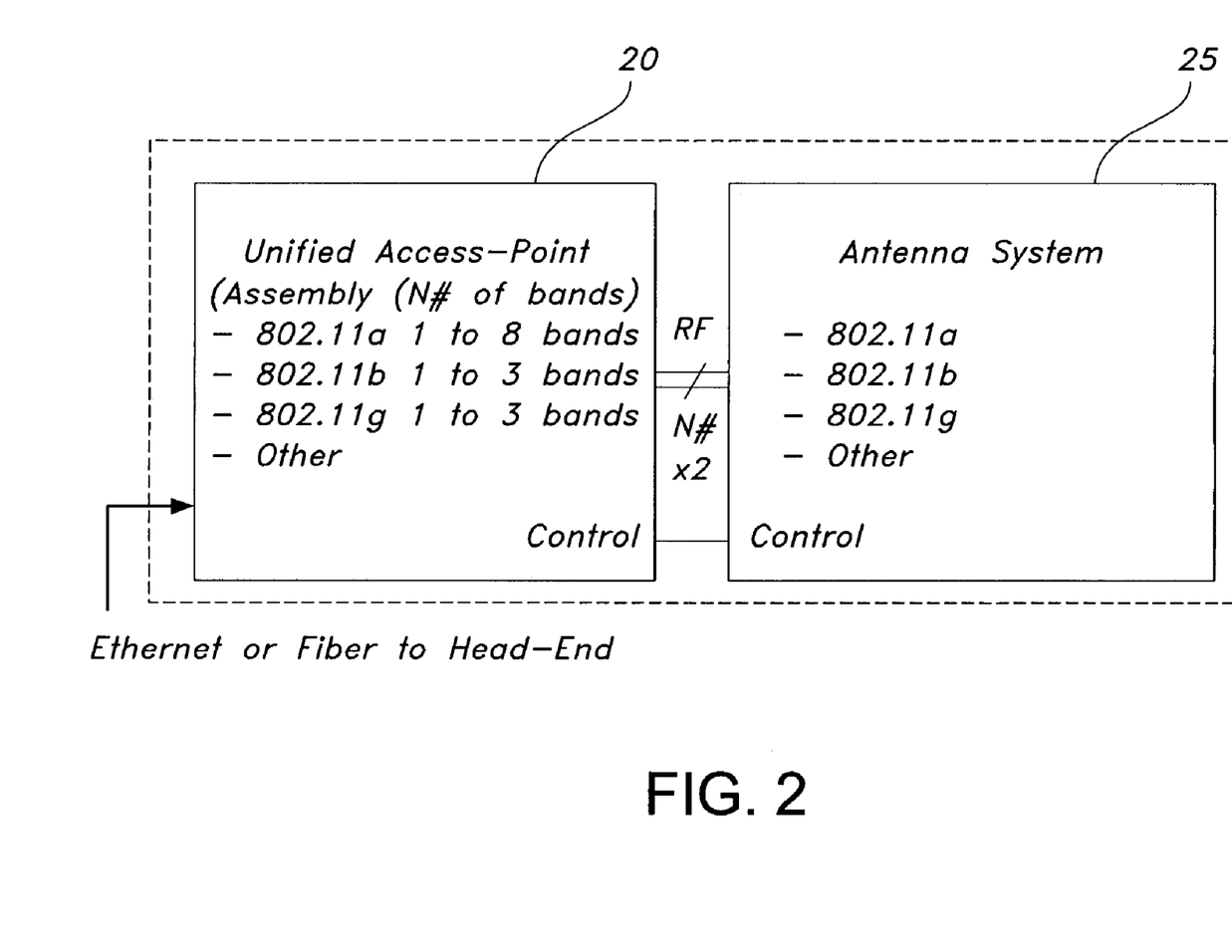
FIG. 2 shows a wireless access point connected to a custom configurable antenna used in the present invention.

COTS access points typically have omni directional antennas. To avoid interference and coverage problems in an aircraft cabin a custom antenna for each cabin location can be designed and installed but this is complicated and expensive with a wide variety of aircraft and seating configurations. With the wireless IFE system 10 of the present invention, the wireless access points 20, 21, and 22 are each connected to an antenna system 25 as shown in FIG. 2. The antenna system 25 enables a plurality of separate beams and frequency bands from each cabin mounted access point 20, 21, and 22, thereby minimizing cabin hardware and mitigating interference from adjacent access points when reusing the same RF bands or sub-bands. The antenna system 25 is capable of transmission and reception of IEEE 802.11a, b, g, and n signals and potentially other future wireless standard or proprietary signals.

Figure 3:
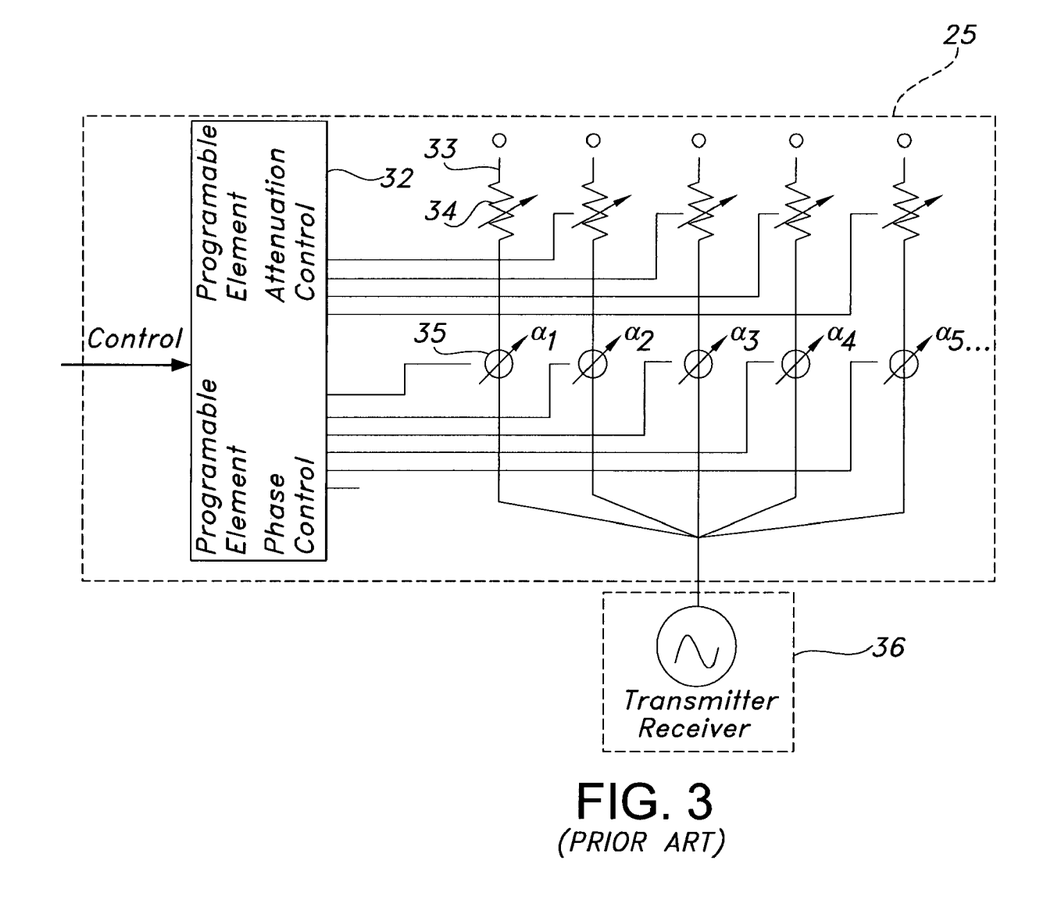
FIG. 3 is a diagram of a configurable antenna implemented as a phased array that may be used in the present invention with the access points of FIG. 2.

The antenna system 25 may be any type of beam controllable antenna known in the art such as an analog or digital phased array, a mechanically or electronically switched array, a hybrid RF switched array, etc. An exemplary version of the antenna system 25 is shown in detail FIG. 3 as a phased array antenna with five radiation elements 33. The radiation elements 33 may be ¾ wavelength elements and more or less radiation elements than five may be used. Control data is received in control function 32 from the head end server 12 over control and data lines 16. An RF signal is received from a receiver/transmitter 36 within each the access point 20, 21, and 22 for radiation by the antenna system 25. The control function 32 provides programmable element attenuation control to attenuators 34 to vary the transmit signal level and programmable element phase control to phase shifters 35 to vary the signal phase thereby steering the radiated beam of the antenna system 25. Polarization switching (not shown) may also be employed to assist in interference rejection between adjacent cells within the aircraft cabin. Separate transmit and receive antenna elements and respective controls (not shown) may be used.

Figure 4:
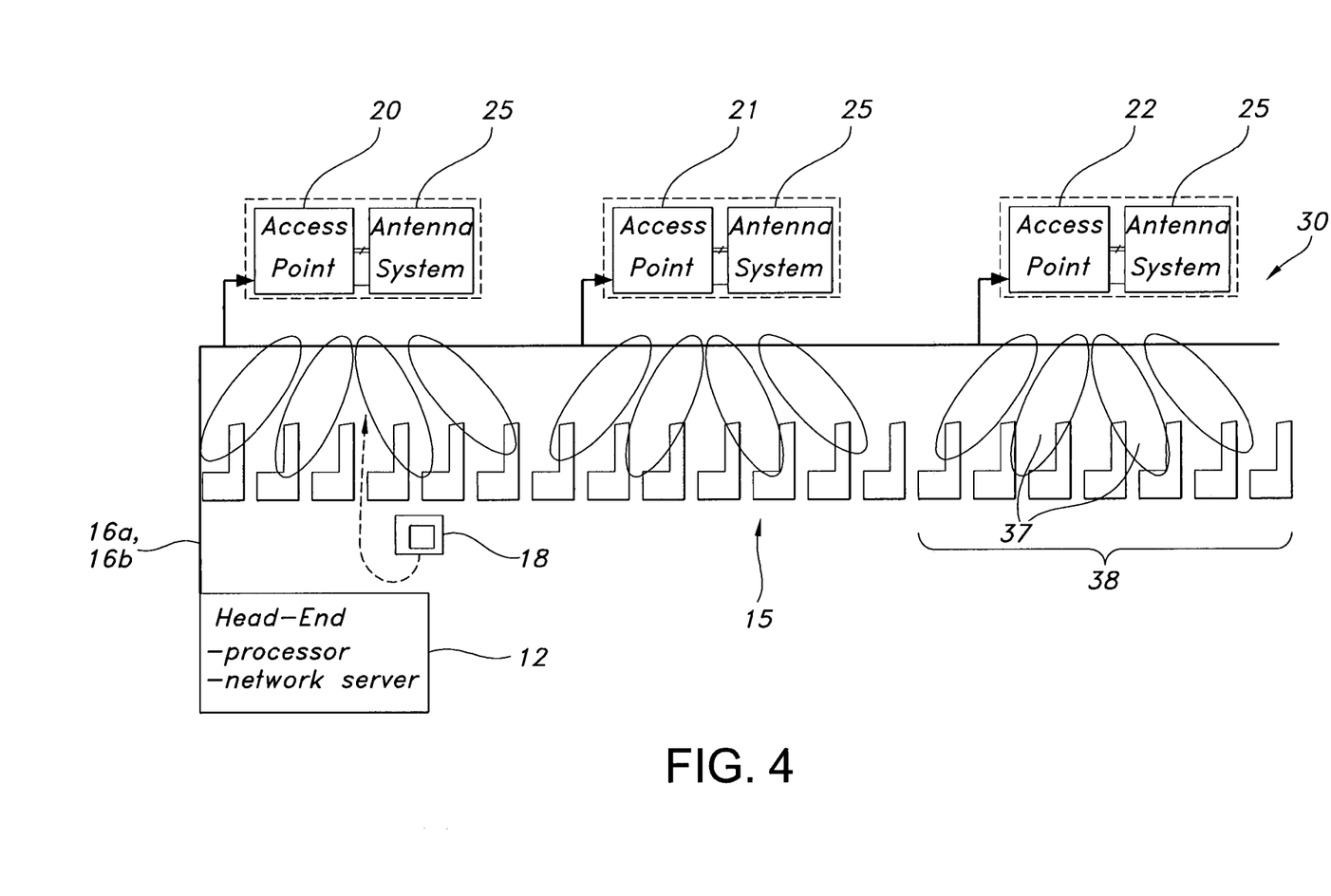
FIG. 4 is a diagram of the system FIG. 1 shown with configurable antennas installed with the access points in the ceiling above a cabin aisle.

The system 10 of FIG. 1 is shown in FIG. 4 as wireless in-flight entertainment (IFE) distribution system 30 of the present invention with antenna systems 25 installed with the access points 20-22 in the ceiling above a cabin aisle, under a baggage bin with a passenger lighting and environmental control assembly, or any other location within the passenger cabin or the aircraft flight deck (not shown) to provide needed signal coverage. Beams 37 radiated from configurable antenna system 25 are shown in exemplary fashion with four beams from each antenna system 25 giving coverage to a group of seats or a cell 38 within the plurality of seats 15. Access points 20-22 may be grouped such that a single installation location may contain a plurality of radios on several bands and the aircraft may contain several of these groups in an aircraft cabin. Each installed access point 20-22 has an associated antenna system 25. If the access point group has three radios then the antenna system 25 may have three independent antenna beams.

Antenna beams 37 from the antenna systems 25 are controlled by an algorithm that may be performed by any computing device in the system 10 such as the head end server 12 or a wireless PED 18 provided the PED 18 has proper authorization. The algorithm adjusts the beams 37 to be directed to designated seating areas or cells 38 with some precision. The algorithm may use bit-error rate (BER) or frame error rate (FER) or any other appropriate data transmission statistic collected when test data is transmitted and fed back from the wireless PED 18 located in the seats 15 and using the access point 20-22 and associated configurable antenna systems 25. By using system BER or FER loop-back test methods, an optimal antenna beam position is computed to configure newly installed wireless access points 20-22 and antenna systems 25. The antenna system 25 is beam steerable to fine tune area coverage from one of several cabin access point clusters. Additionally access point power level may be measured and adjusted to minimize adjacent same RF band cell interference.

The first step in using the method of the present invention is to perform an RF survey by gathering cabin RF fade information and statistics for aircraft cabin areas of interest. The RF survey can be performed using a robotic system 40 shown in FIG. 5 to volumetrically capture cabin RF fade data. The robotic system 40 performs a three-dimensional RF survey thereby giving more accurate data than a two-dimensional survey. The robotic system 40 is shown located in a seat 15a in FIG. 5 with armrests 15b on each side and seatback 15c behind the robotic system 40. In operation a RF transmitter 41 may be temporarily mounted on the ceiling of the aircraft cabin to transmit a test signal. A RF fade pickup antenna 42 mounted to an x, y, z scan apparatus 44 on the robotic system 40 volumetrically scans the seat 15a for RF power levels and/or BER data under control of a computer (not shown). A spectrum analyzer 43 or other measurement device may be used to measure the RF power level and fade data and stores the data snapshots and/or a cumulative record over a time period in a RF fade database (not shown). The robotic system 40 is moved from seat to seat to obtain RF fade measurement data throughout an area of the aircraft cabin. RF coverage is automatically measured at each seat 15 and collected under control of the computer. RF fade data may also be collected using manual control of the robotic system 40 to move the pickup antenna 42.

Once the RF power level and fade data are captured in all desired areas of the aircraft interior including flight deck and cabin passenger seat areas, such as the cell 38 having a number of seats 15 in FIG. 4, the data is entered into a matrix where it is analyzed to determine geometrically if an optimum RF power level is available to sustain the required data rate for the intended broadband connectivity goal to each seat physically or logically defined within the multi-seat cell 38. A qualification determination is made in each cell 38 (e.g. a criteria might be signal-to-noise ratio must generally be greater than 20 dB for a user bit rate to be 48 Mbps or better). Individual seats within a cell 38 that fall statistically below the optimum RF power level require either a more compressed cell spacing, or an optionally switched antenna choice, antenna beam pattern, or pointing direction realignment or a process of both layout and antenna system 25 parameter adjustments. The transmitted RF power level from access points may also be adjusted. As an example the S/N matrix computations for each seat in the cell 38 may suggest an antenna system 25 based on the constraints of an 18-seat cell topology in the cabin to be changed with the cell size reduced from 18 to 13 seats for example and more access points and antenna systems 25 added to the cabin. Cells are moved tighter together (linearly in the cabin) with a reduced number of seats until each seat in a cell provides the minimum user bit rate to sustain broadband applications (video, Internet, VoIP, conferencing etc.). With the reduction in the number of seats in the cell 38, an adjacent cell may grow by the number reduced. Furthermore, if the computations show that a cell has more than the optimum RF power level at each seat, the cell size may be increased by increasing the number of seats and the spacing of cells may be spread further apart. Constraints such as maximum cell RF power level, distance between cells, distance between same band cells may also be part of criteria to solve optimum antenna system 25 arrangements. Some computations can be transcendental in nature and may require iterative methods for solving placement parameters of the antenna system 25. The placement of each cell antenna system 25 can be therefore computed in advance by using the measurement process of the present invention.

The second step is to install the wireless access points 20-22 and antenna systems 25 and then adjust and optimize an antenna beam per data collected by the RF survey fade measurements stored in step one with the robotic system 40. Access points 20-22 and antenna systems 25 are spaced apart so that a minimum video data transfer rate can be maintained per video performance expectations or to a prescribed rate that can be related to RF fade and blockage statistics of the cabin. As an example access points 20-22 must not be located further apart than at a point at which the surveyed RF levels fall below a level supporting a signaling rate of 54-Mbps 90% of the time using off-the shelf 802.11a OFDM radios.

Figure 6:
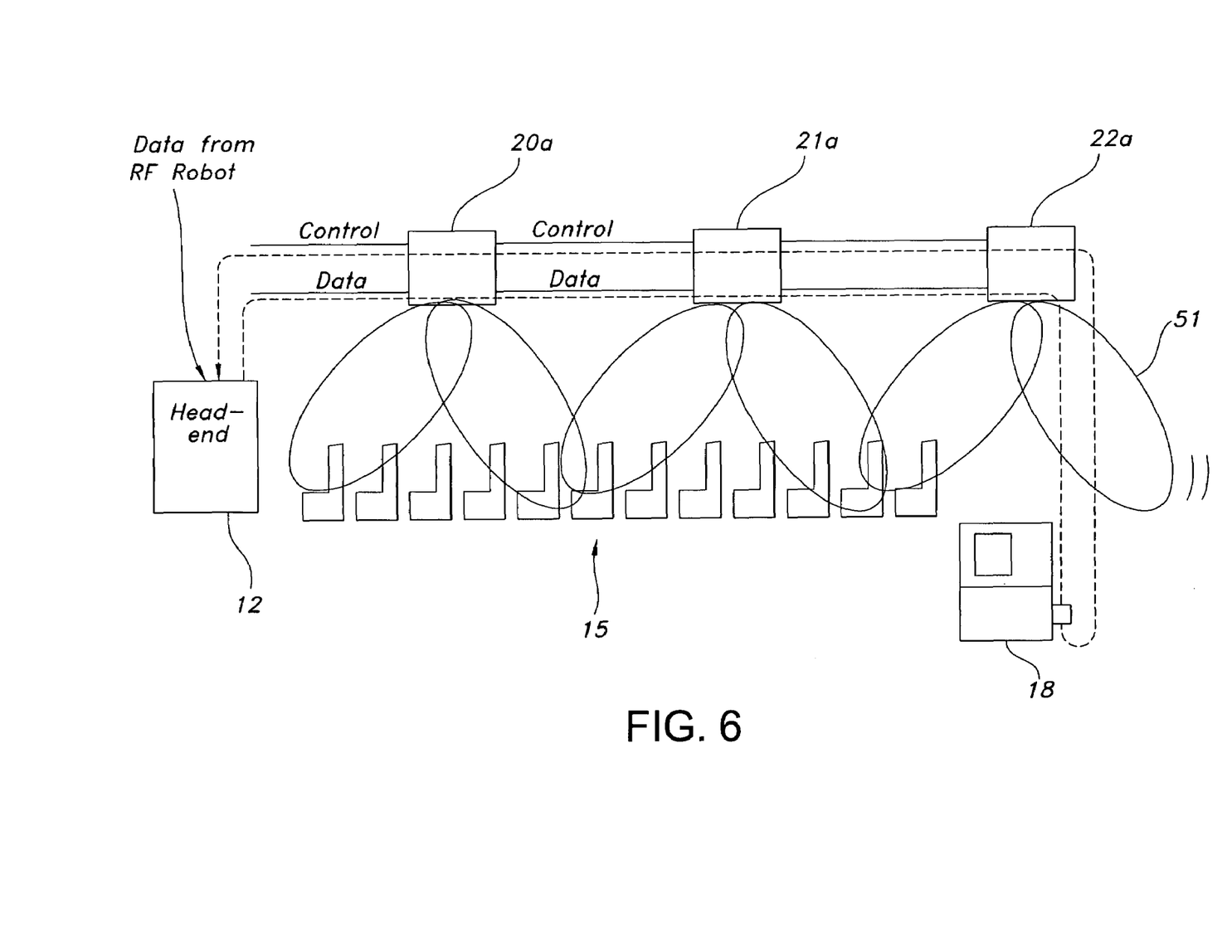
FIG. 6 shows access points and associated antennas optimally located in a cabin for performance of a wireless personal electronic device (PED) loop-back connectivity test between each seat and a head end server using a PED.

The third step after the access points 20-22 and associated antennas systems 25 are located is to perform a wireless PED 18 loop-back connectivity test (bit-error rate test) between each seat in the plurality of seats 15 and the head end server 12 using the PED 18 as shown in FIG. 6. In FIG. 6 the combined access points 20-22 and associated antenna systems 25 are shown as reference numbers 20a, 21a, and 22a. In the loop-back test, the head end server 12 delivers test data while scanning a beam 51, catalogs BER data according to seats 15 and access point 20a, 21a, and 22a antenna beam 51 positions. The antenna systems 25 are steered so that each access point 20a, 21a, and 22a nominally maintains an optimum link with a prescribed sector of the aircraft cabin. Optimum coverage can be programmed and managed from the head end server 12. In the loop-back process the head end server 12 logs BER performance measured by PED 18 for any given PED 18 seat location to each antenna beam position scanned. The head end server 12 computes alternative beam pointing once all area seats 15 are tested. The head end server 12 then reprograms the antenna systems 25 in access points/antennas 20a, 21a, and 22a and reevaluates performance. These steps are repeated if necessary until maximum performance is found for an entire seat area or cell 38 to be served for each access point/antenna 20a, 21a, and 22a. The third step may also be performed by having the test data originate in the PED 18 and be transmitted to the access points/antennas 20a, 21a, and 22a where the data as received and sent to the head end server 12 and transmitted back to the PED 18 for error analysis.

Figure 7:
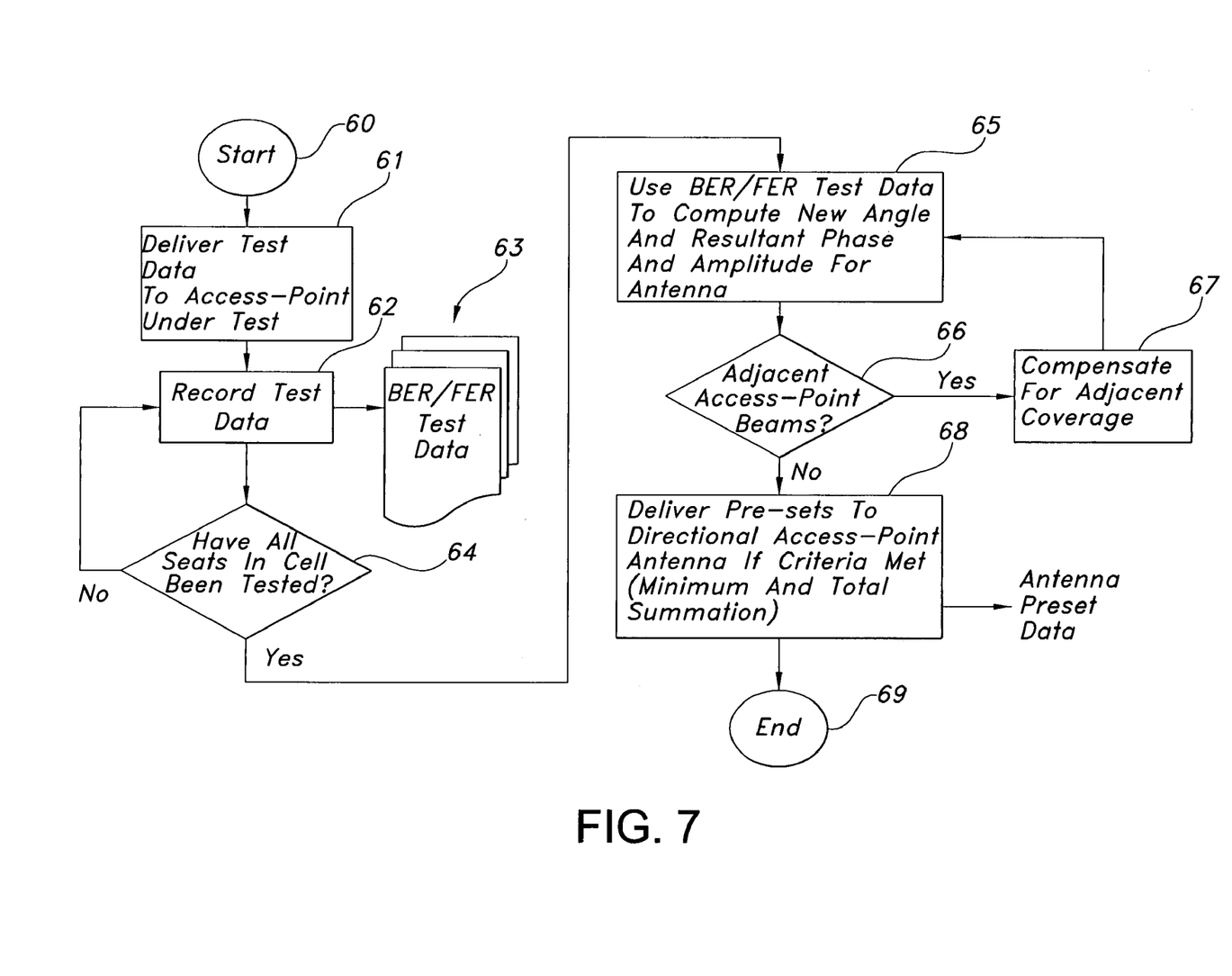
FIG. 7 is a flow chart showing a process for final antenna beam positioning.

In the fourth step after PED loop-back testing is completed for each area in the cabin, the head end server 12 or authorized wireless PED 18 then sends commands to any or all antenna systems 25 in the access points 20a, 21a, and 22a to make fine beam position adjustments based on a summary computation that considers minimum performance requirements to all seat areas and maximum data rate. The final antenna beam position process is illustrated in a flow chart in FIG. 7. In FIG. 7, the process starts at step 60 and in step 61 test data is delivered to an access point 20-22 under test from the head end server 12 and transmitted. The access point 20-22 under test receives and records the test data (step 62) as BER/FER test data 63. Step 64 asks the question have all seats 15 in a cell been tested. If not the record test data step 62 is repeated until all seats 15 have been tested. At step 65 a new antenna beam angle is computed by using the acquired BER/FER measurements from each seat area cell 38. Antenna selection or adjustment is made according to a minimum BER/FER criteria set in advance. Low BER/FER measurements require that the antenna 25 be installed closer or the beam be improved. This can be done by using electronic beam steering or mechanically or electronically switching to another antenna. At step 66 the question is asked are there adjacent access point beams. If the answer is yes, the antenna beam is compensated for adjacent access point coverage in step 67. During setup an initial antenna topology is provided including antenna placement and beam position. Antenna system 25 position and beam positions are known by the head end server 12. Adjustment to an adjacent cell may be through its physical position or through reposition of its beam electrically or by switching to another antenna. If the answer is no, at step 68 presets are delivered to the access point antenna if minimum criteria are met where all seats 15 must exhibit a minimum BER such as a one part in $10^{-5}$ bit errors. This minimum criteria can be an agreed upon level that equates to or designates the networks ability to deliver data at a rate that may be related to video quality. The process ends at step 60. The antenna preset data is stored.

The four steps described above in the method of the present invention may be modified by omitting steps. For example the RF survey data gathered with the robotic system 40 in step one may be previously collected and available for certain aircraft types thereby allowing placement of the access points and antenna systems 25 at predetermined locations. The three remaining steps in the process may then be performed to optimize performance for an individual aircraft installation.

Figure 5:
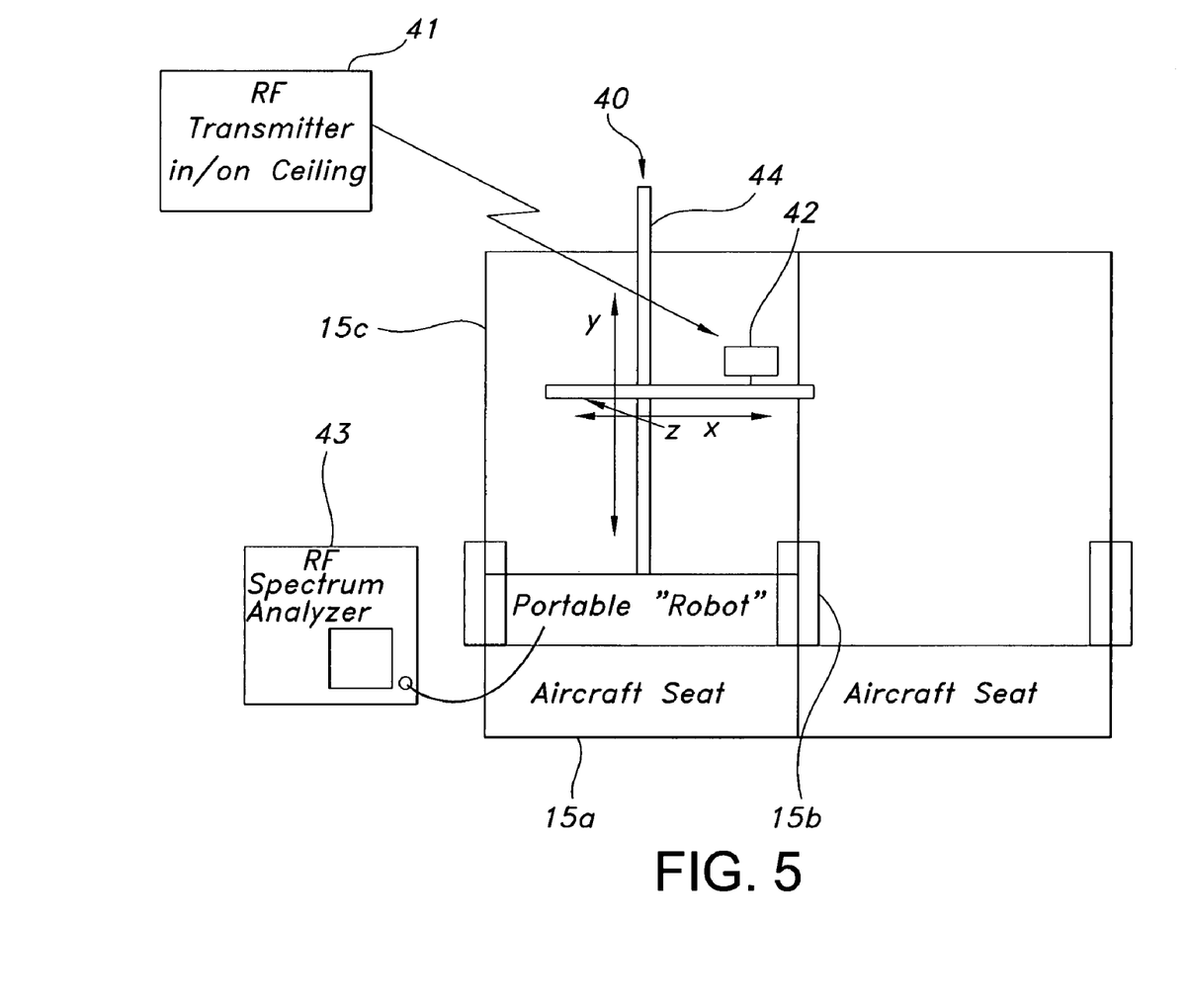
FIG. 5 shows an automated robotic system located in a seat to perform an RF survey by volumetrically gathering cabin RF fade information and statistics for aircraft cabin areas of interest.

In an example of the method of the present invention, a seat group area or cell 38 is identified to receive service such as rows 1-6 and seats A-F in an aircraft cabin. A transmit radio 41 is temporarily placed in the area as shown in FIG. 5. Optimum position of the antenna system 25 and access point 20, 21, and 22 is selected by analysis of the empirically collected data from the x, y, and z robot scanner 40. Assume for best fidelity, a particular antenna beam must at least provide a minimum tested data rate of 48-Mbps to any given seat location (54-Mbps is the highest for 802.11a). Test data reflecting the highest aggregate sum individually for all seats 15 under the area of test and meeting the minimum rate of 48 Mbps is selected as the favored installed beam position from the antenna system 25. As an example, a perfect aggregate sum for 20 seats is 20×54 Mbps=1080 Mbps. The algorithm is if the minimum data rate is 48 Mbps, then the test aggregate sum (e.g. rows 1-6, A-F) is 6 rows×6 columns=36 seats and 36 seats×48 Mbps=1728 Mbps. This is done for each programmable antenna angle meeting the minimum 48-Mbps criteria. The largest numerical result is selected, beam position index is selected and position is set.

Once the wireless system 10 is deployed, each wireless PED 18 becomes part of a permanent process of measuring bit-error-rate in the seat area or cell 38, replacing the robotic measuring system 40. Data collected by the wireless system 10 head-end 12, network, or PED 18 may be processed and made available through a diagnostics interface. The wireless system 10 continuously monitors itself while in use and information collected may be used to make future adjustments to power, antenna selection, and antenna beam direction. Information may also be used to realign the access points 20-22 and antenna systems 25 physically.

Figure 8:
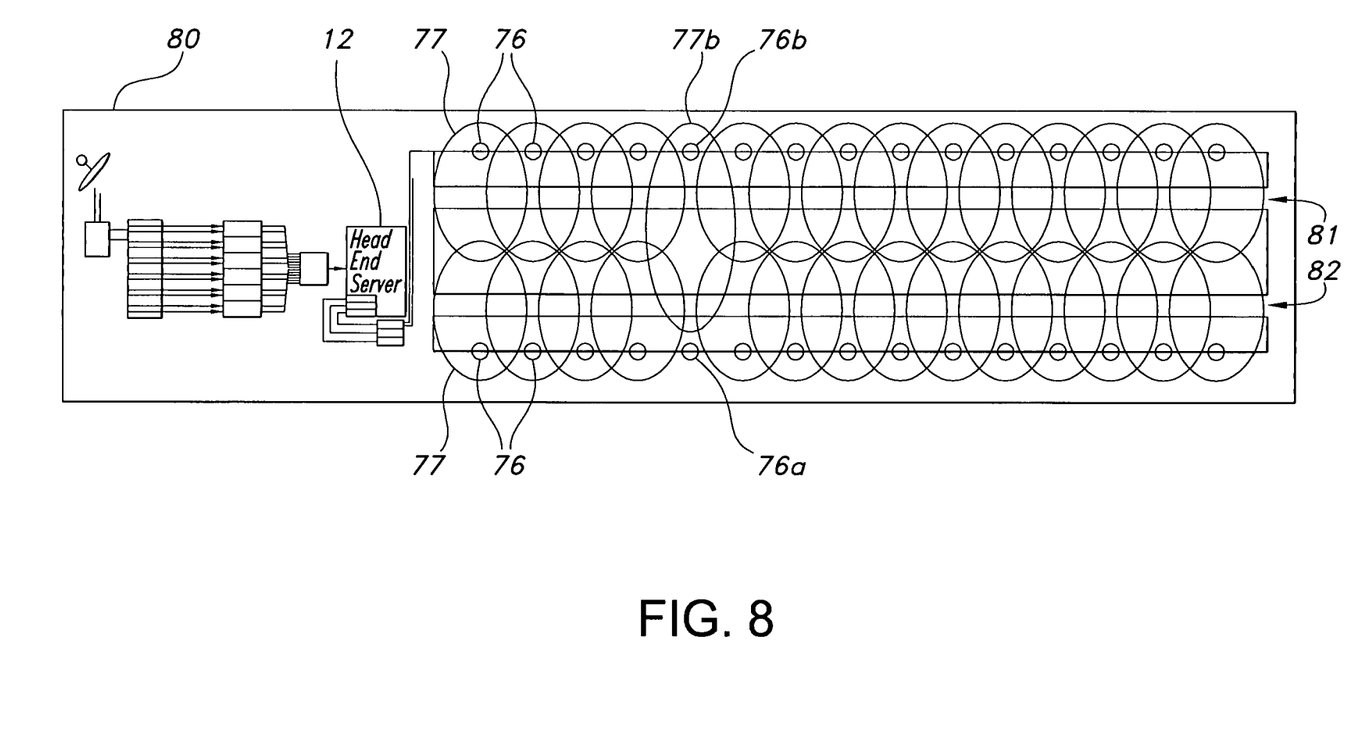
FIG. 8 illustrates an aircraft cabin with access points and antenna systems installed to provide redundancy when an access point or antenna fails.

Wireless access points 20-22 and associated beam controllable antennas 25 may be installed as a system to provide redundancy in all areas or cells 38 in the event a failure occurs with any of the radios. For example in FIG. 8, RF access points and associated controllable antennas 76 may be distributed along the outside seating sections (seating areas near the windows) of an aircraft 80 having twin aisles 81 and 82. U.S. Pat. No. 6,614,126, Integrated Lighting and Data Communications Apparatus, by James P. Mitchell assigned to the assignee of the present invention and incorporated by reference discloses an apparatus to wirelessly transmit data to passenger seats. Each access point and antenna 76 is capable of providing connectivity to approximately 15 seats to the left and right side seating areas, and a portion of the mid-section seating area of the aircraft 80 with its associated beam 77. In FIG. 8, access point and antenna 76a is assumed to fail thereby not providing coverage to seats in its cell as provided by the other access points and antennas 76 with their associated beams 77. The failure of access point and antenna 76a is detected by the head end server 12 through the loop-back detection test. The head end server 12 reassigns service to an alternate access point 76b. Access point 76b adjusts its beam 77b to cover a wider area by increasing transmit power, reconfiguring its antenna beam 77b or selecting a times two signaling mode.

Access point and antennas 76 placed adjacent to one another in the aircraft 80 cabin (left and right side) may also be potentially capable of serving an entire cross-section of the aircraft 80 at a level of service and may be further improved if sufficient power adjustments are made by the wireless system and controllable antenna.

It is believed that the configurable cabin antenna system and placement process of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method of delivering programming to passengers in a plurality of seats at an optimum RF power level with a wireless in-flight entertainment (IFE) distribution system comprising the steps of:

provi­ding control data and the programming in the wireless in-flight entertainment distribution system with a head end server;

receiving the control data and programming with one or more wireless access points connected to the head end server;

providing the programming at the optimum RF power level to the plurality of seats with one or more antenna systems disposed at optimum selected locations in the aircraft cabin and connected to the one or more access points;

receiving the programming from the one or more antenna systems with one or more personal electronic devices (PEDs) located in the plurality of seats;

adjusting beams of said one or more antenna systems to deliver programming to the one or more PEDs at the optimum RF power level;

controlling a beam of the one or more antenna systems with an algorithm performed by a computing device in the wireless IFE distribution system;

measuring RF power level and fade data at the plurality of seats with a robotic system that volumetrically scans the seats and measures RF power level and fade data and stores the data in an RF fade database;

analyzing the stored data to determine if the optimum RF power level is available to sustain a required data rate at each seat in a cell having a number of seats;

installing the one or more antenna systems in the optimum selected locations;

adjusting the antenna beams in accordance with RF power level and fade data;

delivering from the head end server test data while scanning an antenna beam;

measuring BER of the test data with a PED;

cataloging BER data according to seats and antenna beam position;

computing alternative beam pointing when all seats in a cell are tested;

reprogramming the antenna systems;

reevaluating performance;

continuously monitoring, via a diagnostic interface, and repeating the preceding steps until maximum performance is found for all seats in the cell served by each antenna; and commanding the one or more antenna systems to make fine beam position adjustments based on a summary computation that considers minimum performance requirements to all seat cells.

2. A method of delivering programming to a plurality of seats at an optimum RF power level with a wireless in-flight entertainment (IFE) distribution system having one or more antenna systems wherein an optimum RF power level is determined, comprising the steps of:

measuring RF power level and fade data at the plurality of seats with a robotic system that volumetrically scans the seats and measures RF power level and fade data;

analyzing the RF power level and fade data to determine if the optimum RF power level is available to sustain a required data rate at each seat in a cell having a number of seats;

moving antenna system spacing closer together to compress the cell if individual seats within the cell fall below the optimum RF power level to sustain the required data rate;

adjusting antenna system parameters to sustain the required data rate if individual seats within the cell fall below the optimum RF power level;

installing the one or more antenna systems in the optimum selected locations;

adjusting antenna beams in accordance with the RF power level and fade data;

delivering from a head end server test data while scanning an antenna beam;

measuring BER of the test data with a wireless personal electronic device (PED);

cataloging BER data according to seats and antenna beam position;

computing alternative beam pointing when all seats in a cell are tested;

reprogramming the antenna systems;

reevaluating BER performance;

continuously monitoring, via a diagnostic interface, and repeating the preceding steps until maximum performance is found for an entire seat area to be served by each antenna system; and commanding the one or more antenna systems with the one or more access points to make fine beam position adjustments based on a summary computation that considers minimum performance requirements to all seat cells.

* * * * *